United States Patent
Amsterdam et al.

(10) Patent No.: US 8,363,884 B2
(45) Date of Patent: Jan. 29, 2013

(54) WATERMARK HIDING IN DESIGNATED APPLICATIONS

(75) Inventors: Jeffrey D. Amsterdam, Marietta, GA (US); Jason C. Causey, Kennesaw, GA (US); Christopher E. Holladay, Marietta, GA (US); William D. Morgan, Atlanta, GA (US)

(73) Assignee: International Business Machines Corporation, Armonk, NY (US)

( * ) Notice: Subject to any disclaimer, the term of this patent is extended or adjusted under 35 U.S.C. 154(b) by 1120 days.

(21) Appl. No.: 12/264,975

(22) Filed: Nov. 5, 2008

(65) Prior Publication Data

US 2010/0115282 A1    May 6, 2010

(51) Int. Cl.
*G06K 9/00* (2006.01)

(52) U.S. Cl. ......... 382/100; 705/901; 705/904; 705/911

(58) Field of Classification Search .................. 382/100; 705/901–912
See application file for complete search history.

(56) References Cited

U.S. PATENT DOCUMENTS

| | | | |
|---|---|---|---|
| 5,530,759 A | 6/1996 | Braudaway et al. | |
| 7,139,444 B2 * | 11/2006 | Ameline et al. | 382/305 |
| 7,313,250 B2 | 12/2007 | Moskowitz et al. | |
| 7,336,802 B2 | 2/2008 | Kunisa | |
| 7,369,679 B2 * | 5/2008 | Ameline et al. | 382/100 |
| 7,465,370 B2 * | 12/2008 | Daems et al. | 156/277 |
| 7,676,057 B2 * | 3/2010 | Asai | 382/100 |
| 2002/0178362 A1 | 11/2002 | Kwon | |
| 2003/0039376 A1 | 2/2003 | Stach | |
| 2003/0131237 A1 | 7/2003 | Ameline et al. | |
| 2004/0044894 A1 | 3/2004 | Lofgren et al. | |
| 2004/0117427 A1 * | 6/2004 | Allen et al. | 709/200 |
| 2007/0053550 A1 | 3/2007 | Alattar et al. | |

FOREIGN PATENT DOCUMENTS

| | | |
|---|---|---|
| EP | 2071822 A1 | 6/2009 |
| WO | 97/38531 | 10/1997 |

* cited by examiner

*Primary Examiner* — Bhavesh Mehta
*Assistant Examiner* — Utpal Shah
(74) *Attorney, Agent, or Firm* — Patrick J. Daugherty; Driggs, Hogg, Daugherty & Del Zoppo Co., LPA

(57) ABSTRACT

A method, service, and product for hiding a watermark existing in a digital media within a software application, comprising creating a set pattern of pixels represented by coordinates which represent a red, a green, a blue, and an alpha level of color, where the set pattern of pixels covers a set of original pixels within the digital media. The method including determining whether the transparency level of color should be removed from the set pattern of pixels based on a known pixel transparency removal parameter; and modifying the set pattern of pixels to remove the transparency level of color coordinates, wherein an original pixel color can be seen because the set pattern of pixels are made transparent; or not modifying the set of pixels to remove the transparency level of color coordinates, wherein the original pixel color cannot be seen because the set of original pixels is made transparent.

20 Claims, 2 Drawing Sheets

WATERMARK HIDING IN DESIGNATED APPLICATIONS

FIELD OF THE INVENTION

The present invention generally describes a method for hiding a watermark in designated applications.

BACKGROUND OF THE INVENTION

The proliferation of digital media on the Internet has exploded in recent years. With the increase of video and image creation along with its display, growth of theft and unauthorized redistribution of media across the Web has occurred. In general, producers of media intended to be viewed through the internet have an interest in protecting this content.

The advent of personal computers as household appliances has made it convenient for consumers to convert media (which may or may not be copyrighted) which is originally in a physical/analog form or a broadcast form into a universal, digital form (a.k.a. ripping) for location and/or time shifting purposes. Combining ripping with popular file and internet sharing tools has made unauthorized distribution of copies of copyrighted digital media much easier.

Digital rights management (DRM) is one method for protecting digital media. DRM refers to access control technologies used by publishers and copyright holders to limit usage of digital media or devices. DRM technologies attempt to control use of digital media by preventing access, copying, or conversion by end users to other media formats. It may also refer to restrictions associated with specific instances of digital works or devices. In practice, all widely-used DRM systems have been defeated or circumvented when deployed to enough customers. Restricting copying of audio and visual material is especially difficult due to the existence of the analog hole, and that are even suggestions that effective DRM is logically impossible for this reason. DRM can be expensive, intricate, and can complicate the viewing for some users.

Another media protection is through a watermark. Watermarking involves applying a recognizable image or pattern to a media, the image or pattern appearing lighter when viewed by transmitted light (or darker when viewed by reflected light, atop a dark background). Digital watermarking involves embedding information into a digital signal. The signal may be, for example, audio, pictures and video. If the signal is copied, then the information is also carried in the copy. In visible watermarking, the information is visible in the picture or video. Typically, the information is text or a logo which identifies the owner of the media. Digital watermarking is distinct from additional file information called metadata, in that the data is carried in the signal itself, not in addition to the signal.

Watermarking allows a producer to permanently indicate the ownership or source of a media, but it does not prevent others from redistributing the files. Watermarks, also, are permanent and are displayed even when shown in a format for which the media was intended, for example, on the website of the media owner. This permanency degrades the viewing experience to a user.

SUMMARY OF THE INVENTION

A method and product for hiding a watermark existing in a digital media within a software application is provided, comprising creating a set pattern of pixels represented by coordinates which represent a red, a green, a blue, and an alpha level of color, where the set pattern of pixels covers a set of original pixels within the digital media. The method and product includes determining whether the transparency level of color should be removed from the set pattern of pixels based on a known pixel transparency removal parameter.

Some embodiments may modify the set pattern of pixels to remove the transparency level of color coordinates, where an original pixel color can be seen because the set pattern of pixels are made transparent or not modify the set of pixels to remove the transparency level of color coordinates, where the original pixel color cannot be seen because the set of original pixels is made transparent.

In another aspect, methods are provided for deploying a service for hiding a watermark in designated applications, for example by a service provider who offers to implement, deploy, and/or perform functions for others. Still further, an article of manufacture comprising a computer usable storage medium having a computer readable program in said medium may be provided. Such program code comprises instructions which, when executed on a computer system, cause the computer system to perform one or more method and/or process elements for changing project length based on fuzzy logic techniques, for example as described above. Moreover, systems, articles and programmable devices configured for performing one or more method and/or process elements of the current invention for recycling a material as a function of interactively determining an appropriate category, for example as described above, are also provided.

BRIEF DESCRIPTION OF THE DRAWINGS

These and other features of this invention will be more readily understood from the following detailed description of the various aspects of the invention taken in conjunction with the accompanying drawings in which.

Figure 1:
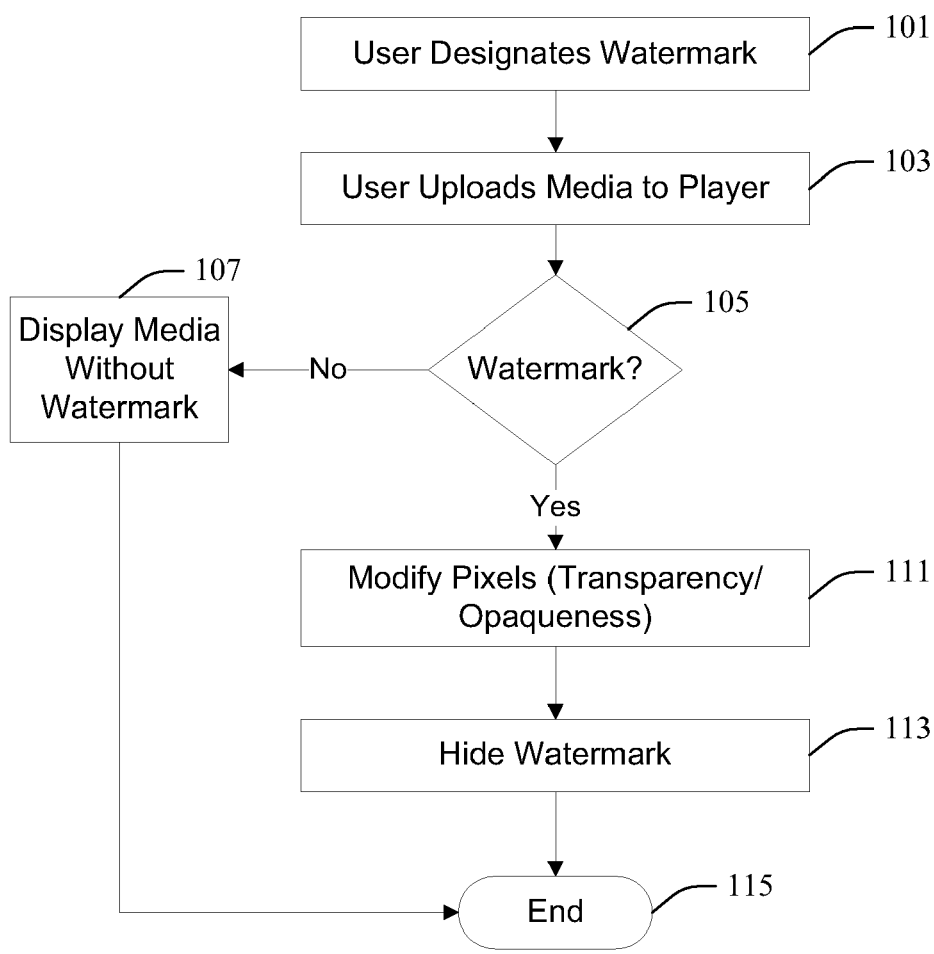
FIG. 1 is a flow chart illustrating a process for hiding a watermark in a designated application.

The drawings are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION OF THE INVENTION

For convenience purposes, the Detailed Description of the Invention has the following sections:
I. General Description
II. Computerized Implementation
I. General Description Creators of digital media generally determine an individualized watermark in which to use for their own creations, for example, an image, a specific listing of letters or numbers, or a symbol. FIG. 1 describes a method for hiding a watermark in a designated application. Hiding a watermark may occur through a plurality of apparatuses or software programs. Some embodiments are described more fully below and other examples will be apparent to one skilled in the art, while numerous modifications and substitutions are possible without deviating from the claims of the invention. At 101, a creator adds a watermark to media he or she has created. Adding a watermark at 101 generally involves including a grouping of individual pixels within the media signal. These pixels are often represented by coordinates within the RGB color space, which represent the red, green, and blue levels of the color, respectively. Other color spaces may exist, but generally color values are represented with a coordinate triplet. Many formats, for example, PNG and Flash Video, use an augmented color space which adds a fourth coordinate with a given designation, for example "alpha," which may represent a transparency level for the given pixel. Thus in this embodiment, transparency information can be added to an RGB image to create an RGBA image. A pixel with an alpha value of 100%, for example, will be completely opaque, while an alpha value of 0% will make it completely transparent; and various levels between these extremes are possible, depending on the container format. For some embodiments, this transparency designation may act as a key in the determination of whether the media is being displayed in a designated media player.

At 101, a creator may also add a collection of transparent pixels grouped together as the watermark. By making a set pattern of pixels transparent, a reverse watermark is created. When this media is shown against a solid background, the transparent pattern of pixels create an image on the media. In some embodiments, each pixel that is part of the watermark can be modified to remove the transparency, allowing the original color of the pixel to show.

Storing a watermark in a data file involves methods which ensure data integrity, generally combining aspects of data hashing and digital watermarking. A typical data hash will include processing an input file to produce an alphanumeric string unique to the data file. Should the file be modified, for example, by changing one or more bit within the original file, the same hash process on the modified file will produce a different alphanumeric string. Through this embodiment, a trusted source, for example a designated media player, can calculate the hash of an original data file and a user of the file can verify the integrity of the data.

At 103, a creator or user uploads the created digital media to a media player. At 103, the media player may be a designated or a non-designated player, for example, a media player produced for the creator's website or a general display website such as YouTube. At 103, the user of the media may not be the creator and is uploading a copy of the digital media to a media player for display and distribution. In general, if the application is not a designated player, the set pattern of pixels in the designated watermark would be displayed to ensure that the ownership and rights of the media creator are known.

At 105, the existence of a watermark is determined. Determining whether a watermark exists within a media may occur through many processes. In some embodiments, as discussed above, determination may occur through searching each pixel for a transparency designation or alpha channel. If a transparency designation is found within the digital media, a determination may then be made to ascertain if groupings of pixels with transparency designations exist and to determine if these groupings are one of a set pattern of pixels known by the application. In additional embodiments, determination of the existence of a watermark may happen through searching through all the pixels within a media to determine if groupings of pixels exist which match one or more of the known patterns of pixels previously entered into the application. Some embodiments may also determine the presence of a watermark through determining if a reverse watermark exists through searching opaque pixels for known patterns. Additional embodiments may determine the existence of a set pattern of pixels based on a meta-data set stored in association with the digital media. For these embodiments, the meta-data may be, for example, a code representing the set pattern of pixels or a series of (X, Y) coordinates further describing a location of the set pattern of pixels.

If no watermark exists, for example, a creator did not include a watermark, a digital media is thereafter displayed at 107 without the watermark. If a watermark is found at 105, the media may also be displayed with the watermark in place and fully transparent, for example, showing the color of the background behind the watermark and effectively displaying the watermark. When a designated media player is employed, a watermark will not be subsequently displayed on the digital media, with the set pattern of pixels representing the watermark being modified at 113.

A watermark created with transparency modification available can be represented as a series of pixel coordinates. Removing transparency in these set pattern of pixels at 113 may require an application to be able to find these coordinates in order to know which pixels to modify. A number of methods may be applied at 113 to determine which pixels of a given digital media to modify.

In one embodiment, the application may be programmed with only one watermark pattern, all media intended to play through this application would be created with the same watermark. In second embodiment, the application may search for any pixel with an alpha value indicating some level of transparency, for example, an application may start examining pixels at an origin pixel represented by (0,0), and thereafter examine each pixel in the image or first frame of the video or other digital media. Each pixel would subsequently be examined to determine whether a transparency level exists. Each pixel with a transparency value would be recorded in a data structure. The application may then use this list of points to loop through each pixel and modify each pixel's transparency value.

A third embodiment may include programming a set number of patterns, for example, represented as a set of (X, Y) coordinates, into the application. This embodiment may also have the application load patterns from a digital storage media, for example, an XML file. Each pattern programmed into the application may be given an identifying code number, for example, the image or video name including this code number to identify which watermark pattern is used for a particular image.

In a fourth embodiment metadata stored within a video or image may also identify the pattern of pixels used in a watermark. This data may be accessed from the application displaying the image or video. The metadata may either be a series of X-Y coordinates identifying the watermark, or a code representing a pattern of pixels loaded into the application. The watermark is thereafter hidden at 115 and the application ends at 117.

Figure 2:
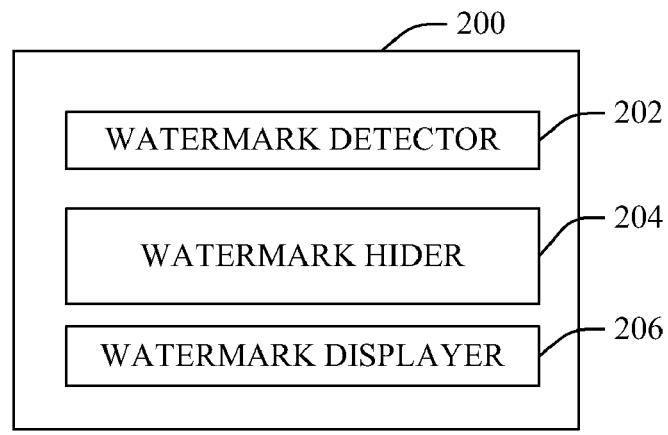
FIG. 2 is a block diagram illustrating a system or device which hides a watermark in a designated application.

FIG. 2 illustrates one embodiment of a Watermark Hiding Device 200 which may be used to hide a watermark in a designated application. The Watermark Hiding Device 200 comprises a Watermark Detector 202, a Watermark Hider 204, and a Watermark Displayer 206.

The Watermark Detector 202 comprises logic units configured for determining the presence of a watermark when the Watermark Hiding Device 200 is initiated. In some embodiments the Watermark Detector 202 is initiated when a user uploads digital media to a media player. The Watermark Detector 202 is activated, for example, if an alpha channel or transparency level is detected anywhere within the digital media. Detection by 202 may occur through the processes as described previously with regards to FIG. 1 at 105. If no watermark is detected by the logic units 202, the Watermark Hiding Device 200 is deactivated and the digital media is displayed with the watermark intact. The Watermark Hider 204 comprises logic units configured for hiding a watermark once one is determined to be present by the Watermark Detector. Hiding at 204 may occur through one of the processes discussed previously with regards to FIG. 1 at 113.

The Watermark Displayer 206 comprises logic units configured for displaying or not displaying a watermark once it has been hidden. For some embodiments of the Displayer 206, web-based applications are made available to a creator to allow the user to verify the authenticity of a media playing application or the authenticity of a created digital watermark.

II. Computerized Implementation

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. Thus embodiments of the present invention comprise methods, apparatus (e.g. systems, devices, etc.) and computer program products. For example, it will be understood that each block of the flowchart illustrations and/or block diagrams of the figures, including FIGS. 1 and 2 as described above, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Referring now to FIGS. 1 and 2, the flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Figure 3:
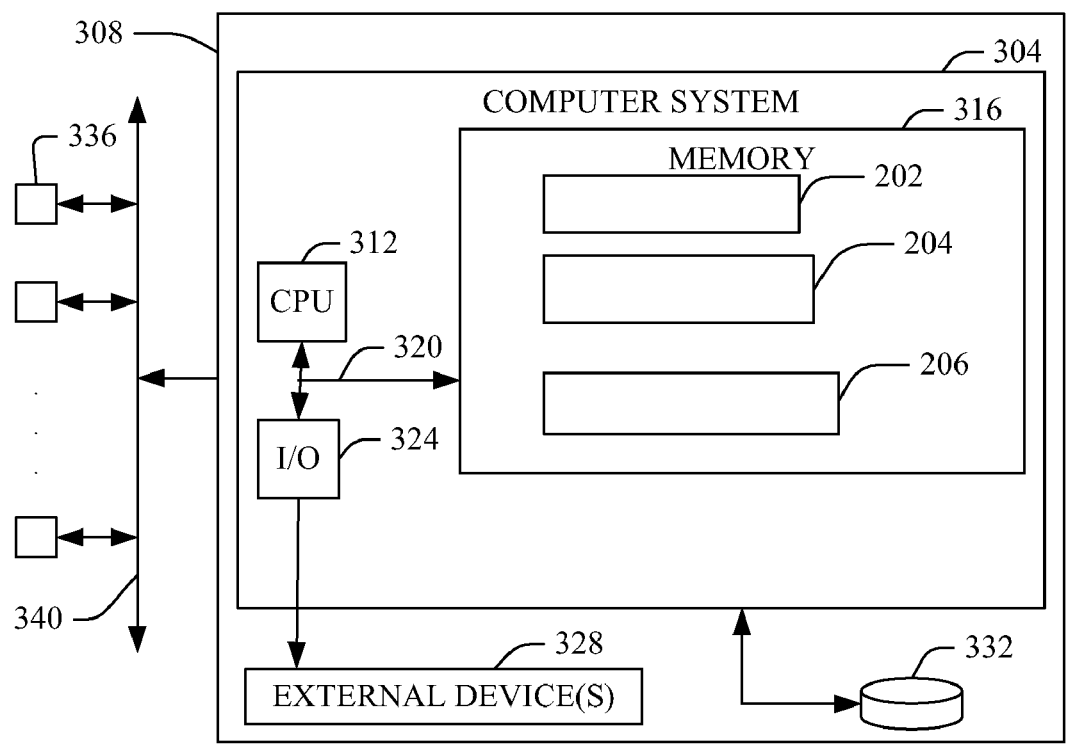
FIG. 3 is a block diagram illustrating an exemplary computerized implementation of a process and system which hides a watermark in a designated application.

Referring now to FIG. 3, an exemplary computerized implementation includes a computer system 304 deployed within a computer infrastructure 308 such as a computer or a programmable device such as a personal digital assistant (PDA) or cellular phone. This is intended to demonstrate, among other things, that the present invention could be implemented within a network environment 340 (e.g., the Internet, a wide area network (WAN), a local area network (LAN), a virtual private network (VPN), etc.) in communication with one or more additional computers 336, or on a stand-alone computer infrastructure 308. In the case of the former, communication throughout the network 340 can occur via any combination of various types of communication links. For example, the communication links can comprise addressable connections that may utilize any combination of wired and/or wireless transmission methods. Where communications occur via the Internet, connectivity could be provided by conventional TCP/IP sockets-based protocol, and an Internet service provider could be used to establish connectivity to the Internet.

As shown, the computer system 304 includes a central processing unit (CPU) 312, a memory 316, a bus 320, and input/output (I/O) interfaces 324. Further, the computer system 304 is shown in communication with external I/O devices/resources 328 and storage system 332. In general, the processing unit 312 executes computer program code, such as the code to implement various components of the process hiding a watermark in a designated application as illustrated in FIGS. 1 and 2 and described above, for example including the Watermark Detector 202, the Watermark Hider 204, and the Watermark Displayer 206 components discussed above, which are stored in memory 316 and/or storage system 332. It is to be appreciated that two or more, including all, of these components may be implemented as a single component.

While executing computer program code, the processing unit 312 can read and/or write data to/from the memory 316, the storage system 332, and/or the I/O interfaces 324. The bus 320 provides a communication link between each of the components in computer system 304. The external devices 328 can comprise any devices (e.g., keyboard, pointing device, display, etc.) that enable a user to interact with computer system 304 and/or any devices (e.g., network card, modem, etc.) that enable computer system 304 to communicate with one or more other computing devices.

The computer infrastructure 308 is only illustrative of various types of computer infrastructures for implementing the invention. For example, in one embodiment, computer infrastructure 308 comprises two or more computing devices (e.g., a server cluster) that communicate over a network to perform the various process steps of the invention. Moreover, computer system 304 is only representative of various possible computer systems that can include numerous combinations of hardware.

To this extent, in other embodiments, the computer system 304 can comprise any specific purpose-computing article of manufacture comprising hardware and/or computer program code for performing specific functions, any computing article of manufacture that comprises a combination of specific purpose and general-purpose hardware/software, or the like. In each case, the program code and hardware can be created using standard programming and engineering techniques, respectively. Moreover, the processing unit 312 may comprise a single processing unit, or be distributed across one or more processing units in one or more locations, e.g., on a client and server. Similarly, the memory 316 and/or the storage system 332 can comprise any combination of various types of data storage and/or transmission media that reside at one or more physical locations.

Further, I/O interfaces 324 can comprise any system for exchanging information with one or more of the external device 328. Still further, it is understood that one or more additional components (e.g., system software, math co-processing unit, etc.) not shown in FIG. 3 can be included in computer system 304. However, if computer system 304 comprises a handheld device or the like, it is understood that one or more of the external devices 328 (e.g., a display) and/or the storage system 332 could be contained within computer system 304, not externally as shown.

The storage system 332 can be any type of system (e.g., a database) capable of providing storage for information under the present invention. To this extent, the storage system 332 could include one or more storage devices, such as a magnetic disk drive or an optical disk drive. In another embodiment, the storage system 332 includes data distributed across, for example, a local area network (LAN), wide area network (WAN) or a storage area network (SAN) (not shown). In addition, although not shown, additional components, such as cache memory, communication systems, system software, etc., may be incorporated into computer system 304.

Still yet, computer infrastructure 308 is intended to demonstrate that some or all of the components of implementation could be deployed, managed, serviced, etc. by a service provider who offers to implement, deploy, and/or perform the functions of the present invention for others, for example by licensing methods and browser or application server technology according to the present invention to an internet service providers (ISP) or cellular telephone provider. In one embodiment, the invention may comprise a business method that performs the process steps of the invention on a subscription, advertising, and/or fee basis. Thus, a service provider can create, maintain, support, etc., a computer infrastructure, such as the computer infrastructure 308 that performs the process steps of the invention for one or more customers, and in return the service provider can receive payment from the customer(s) under a subscription and/or fee agreement and/or the service provider can receive payment from the sale of advertising content to one or more third parties.

The invention also provides for computer-implemented methods according to the present application. In this case, a computer infrastructure, such as computer infrastructure 308, can be provided and one or more systems for performing the process steps of the invention can be obtained (e.g., created, purchased, used, modified, etc.) and deployed to the computer infrastructure. To this extent, the deployment of a system can comprise one or more of: (1) installing program code on a computing device, such as computer system 304, from a computer-readable medium; (2) adding one or more computing devices to the computer infrastructure; and (3) incorporating and/or modifying one or more existing systems of the computer infrastructure to enable the computer infrastructure to perform the process steps of the invention.

As used herein, it is understood that the terms "program code" and "computer program code" are synonymous and mean any expression, in any language, code or notation, of a set of instructions intended to cause a computing device having an information processing capability to perform a particular function either directly or after either or both of the following: (a) conversion to another language, code or notation; and/or (b) reproduction in a different material form. To this extent, program code can be embodied as one or more of: an application/software program, component software/a library of functions, an operating system, a basic I/O system/driver for a particular computing and/or I/O device, and the like.

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to a person skilled in the art are intended to be included within the scope of the invention as defined by the accompanying claims.

What is claimed is:

1. A method for selectively displaying a watermark existing in a digital media file, the method comprising:
in response to uploading a digital media file to a media player searching each pixel of image data of the digital media file for a transparency level coordinate value, wherein the transparency level coordinate value is selected to cause a pixel red color level, green color level and blue color level data of a pixel to be displayed within image data of the digital media file by the media player;

if the searching of the image pixels finds the transparency level coordinate value in any of the pixels, determining if a group of the digital media file image data pixels each comprise the transparency level coordinate value and together define a known watermark pattern of individual image pixels represented by red color level coordinates, green color level coordinates, and blue color level coordinates of the group of pixels;

if the group of pixels comprises the transparency level coordinate value and defines the known pattern of individual image pixels, determining whether the media player is a designated media player;

if determined that the media player is a designated media player, modifying the value of the transparency level coordinate of each of the group of pixels so that the known watermark pattern defined by the group of pixels is not visible when the image pixel data of the digital media file is displayed by the media player; and if determined that the media player is not a designated media player, not modifying the value of the transparency level coordinate of each of the group of pixels so that the known watermark pattern as defined by the red color level coordinates, the green color level coordinates and the blue color level coordinates of the group of pixels is visible when the image pixel data of the digital media file is displayed in an image by the media player.

2. The method of claim 1, wherein the known watermark pattern group of pixels are identified in meta-data stored in association with the digital media file, and wherein the meta-data comprises code representing a set pattern of pixels.

3. The method of claim 2, wherein the meta-data is accessed from within an application displaying the digital media and the meta-data is further represented as a series of (X,Y) coordinates further describing a location of the known watermark pattern group of pixels.

4. The method of claim 1, wherein the transparency level coordinate value is selected to cause the known watermark pattern as defined by the red color level coordinates, the green color level coordinates, and the blue color level coordinates of the group of pixels to be opaque and thereby visible when the image pixel data of the digital media file is displayed by the media player.

5. The method of claim 1, wherein the transparency level coordinate value is selected to cause the known watermark pattern as defined by the red color level coordinates, the green color level coordinates, and the blue color level coordinates of the group of pixels to be transparent and thereby visible against a solid background of display of the digital media file image data by the media player.

6. A method for providing a service for selectively displaying a watermark existing in a digital media file, the method comprising:

providing a media player computer infrastructure that:

in response to uploading a digital media file to the media player, searches each pixel of image data of the digital media file for a transparency level coordinate value, wherein the transparency level coordinate value is selected to cause a red color level, a green color level and a blue color level of a pixel to be displayed within image data of the digital media file by the media player;

if the searching of the image pixels finds the transparency level coordinate value in any of the pixels, determines if a group of the digital media file image data pixels each comprise the transparency level coordinate value and together define a known watermark pattern of individual image pixels represented by red color level coordinates, green color level coordinates, and blue color level coordinates of the group of pixels;

if the group of pixels comprises the transparency level coordinate value and defines the known pattern of individual image pixels, determines whether the media player is a designated media player;

if determined that the media player is a designated media player, modifies the value of the transparency level coordinate of each of the group of pixels so that the known watermark pattern defined by the group of pixels is not visible when the image pixel data of the digital media file is displayed by the media player; and if determined that the media player is not a designated media player, does not modify the value of the transparency level coordinate of each of the group of pixels, so that the known watermark pattern as defined by the red color level coordinates, the green color level coordinates, and the blue color level coordinates of the group of pixels is visible when the image pixel data of the digital media file is displayed in an image by the media player.

7. The method of claim 6, wherein the transparency level coordinate value is selected to cause the known watermark pattern as defined by the red color level coordinates, the green color level coordinates, and the blue color level coordinates of the group of pixels to be opaque and thereby visible when the image pixel data of the digital media file is displayed by the media player.

8. The method of claim 6, wherein the transparency level coordinate value is selected to cause the known watermark pattern as defined by the red color level coordinates, the green color level coordinates, and the blue color level coordinates of the group of pixels to be transparent and thereby visible against a solid background of a display of the digital media file image data by the media player.

9. The method of claim 6, wherein the known watermark pattern group of pixels are identified in meta-data stored in association with the digital media file, and wherein the meta-data comprises code representing a set pattern of pixels.

10. The method of claim 9, wherein the media player computer infrastructure accesses the meta-data from within an application displaying the digital media, and wherein the meta-data is further represented as a series of (X, Y) coordinates describing a location of the known watermark pattern group of pixels.

11. An article of manufacture, comprising:

a computer-readable tangible storage device having computer readable program code embodied therewith, the computer readable program code comprising instructions that, when executed by a computer system processing unit of a media player, cause the media player processing unit to:

in response to an upload of a digital media file to the media player, search each pixel of image data of the digital media file for a transparency level coordinate value, wherein the transparency level coordinate value is selected to cause a red color level, a green color level and a blue color level of a pixel to be displayed within image data of the digital media file by the media player;

if the search of the image pixels finds the transparency level coordinate value in any of the pixels, determine if a group of the digital media file image data pixels each comprise the transparency level coordinate value and together define a known watermark pattern of individual image pixels represented by red color level coordinates, green color level coordinates, and blue color level coordinates of the group of pixels;

if the group of pixels comprises the transparency level coordinate value and defines the known pattern of individual image pixels, determine whether the media player is a designated media player;

if determined that the media player is a designated media player, modify the value of the transparency level coordinate of each of the group of pixels so that the known watermark pattern defined by the group of pixels is not visible when the image pixel data of the digital media file is displayed by the media player; and if determined that the media player is not a designated media player, not modify the value of the transparency level coordinate of each of the group of pixels, so that the known watermark pattern as defined by the red color level coordinates, the green color level coordinates, and the blue color level coordinates of the group of pixels is visible when the image pixel data of the digital media file is displayed in an image by the media player.

12. The article of manufacture of claim 11, wherein the transparency level coordinate value is selected to cause the known watermark pattern as defined by the red color level coordinates, the green color level coordinates, and the blue color level coordinates of the group of pixels to be opaque and thereby visible when the image pixel data of the digital media file is displayed by the media player.

13. The article of manufacture of claim 11, wherein the transparency level coordinate value is selected to cause the known watermark pattern as defined by the red color level coordinates, the green color level coordinates, and the blue color level coordinates of the group of pixels to be transparent and thereby visible against a solid background of a display of the digital media file image data by the media player.

14. The article of manufacture of claim 11, wherein the known watermark pattern group of pixels are identified in meta-data stored in association with the digital media file, and wherein the meta-data comprises code representing a set pattern of pixels.

15. The article of manufacture of claim 14, wherein the computer readable program code instructions, when executed by the processing unit, further cause the processing unit to access the meta-data from within an application displaying the digital media, and wherein the meta-data is further represented as a series of (X, Y) coordinates describing a location of the known watermark pattern group of pixels.

16. A media player system, comprising:
a processing unit, a computer readable memory and a computer-readable storage medium;
wherein the processing unit, when executing program instructions stored on the computer-readable storage medium via the computer readable memory:
in response to an upload of a digital media file to the media player, searches each pixel of image data of the digital media file for a transparency level coordinate value, wherein the transparency level coordinate value is selected to cause a red color level, a green color level and a blue color level of a pixel to be displayed within image data of the digital media file by the media player;

if the search of the image pixels finds the transparency level coordinate value in any of the pixels, determines if a group of the digital media file image data pixels each comprise the transparency level coordinate value and together define a known watermark pattern of individual image pixels represented by red color level coordinates, green color level coordinates, and blue color level coordinates of the group of pixels;

if the group of pixels comprises the transparency level coordinate value and defines the known pattern of individual image pixels, determines whether the media player is a designated media player;

if determined that the media player is a designated media player, modifies the value of the transparency level coordinate of each of the group of pixels so that the known watermark pattern defined by the group of pixels is not visible when the image pixel data of the digital media file is displayed by the media player; and if determined that the media player is not a designated media player, does not modify the value of the transparency level coordinate of each of the group of pixels, so that the known watermark pattern as defined by the red color level coordinates, the green color level coordinates, and the blue color level coordinates of the group of pixels is visible when the image pixel data of the digital media file is displayed in an image by the media player.

17. The system of claim 16, wherein the transparency level coordinate value is selected to cause the known watermark pattern as defined by the red color level coordinates, the green color level coordinates, and the blue color level coordinates of the group of pixels to be opaque and thereby visible when the image pixel data of the digital media file is displayed by the media player.

18. The system of claim 16, wherein the transparency level coordinate value is selected to cause the known watermark pattern as defined by the red color level coordinates, the green color level coordinates, and the blue color level coordinates of the group of pixels to be transparent and thereby visible against a solid background of a display of the digital media file image data by the media player.

19. The system of claim 16, wherein the known watermark pattern group of pixels are identified in meta-data stored in association with the digital media file, and wherein the meta-data comprises code representing a set pattern of pixels.

20. The system of claim 19, wherein the processing unit accesses the meta-data from within an application displaying the digital media, and wherein the meta-data is further represented as a series of (X, Y) coordinates describing a location of the known watermark pattern group of pixels.

\* \* \* \* \*